Dec. 12, 1944.　　　H. N. SUDDUTH　　　2,364,927
AIR BRAKE
Filed July 29, 1943　　　3 Sheets-Sheet 1

Inventor
Henry Norton Sudduth

By

Attorneys

Dec. 12, 1944. H. N. SUDDUTH 2,364,927
AIR BRAKE
Filed July 29, 1943 3 Sheets-Sheet 2

Inventor
Henry Norton Sudduth
By
Attorneys

Dec. 12, 1944.   H. N. SUDDUTH   2,364,927
AIR BRAKE
Filed July 29, 1943   3 Sheets-Sheet 3

Inventor
Henry Norton Sudduth
By Dodge and Sons
Attorneys

Patented Dec. 12, 1944

2,364,927

UNITED STATES PATENT OFFICE 2,364,927

AIR BRAKE

Henry Norton Sudduth, Watertown, N. Y., assignor to The New York Air Brake Company, a corporation of New Jersey Application July 29, 1943, Serial No. 496,631

6 Claims. (Cl. 303—22)

This invention relates to air brakes and particularly an empty and load brake suited for use in passenger and express trains.

Under existing operating conditions on railroads there is an increasing tendency to use light weight baggage cars, and box-type cars mounted on passenger trucks, at the head ends of passenger trains operating on fast schedules.

Since these cars are often loaded to capacity, the ratio of gross weight to tare weight greatly exceeds that customarily encountered in passenger service and since several such cars are often connected in a single train, the present practice seriously impairs the braking ratio of the train as a whole.

There is immediate need for empty and load brakes for this equipment. Such brakes might also be used to advantage with certain light weight passenger cars, but the need for this is not immediate.

Empty and load equipment for freight cars is well established. Freight brakes are of the displacement type and use a second brake cylinder for load braking. This practice is not suited to use with modern passenger brakes which are of the relay type.

The present invention avails of the tried and proven control used to sense light and load conditions in freight service and modifies it to exercise control over a relay type of passenger brake, so that the relay gives a low braking ratio on empty or light loaded cars and a high braking ratio on loaded cars. In addition it permits use of a four-ratio type of passenger relay now rapidly becoming standard on American railroads for passenger service, and ensures the operation of the inshot valve for the light ratio, so that the application under light conditions will synchronize with application on passenger cars throughout the train.

Figure 1:
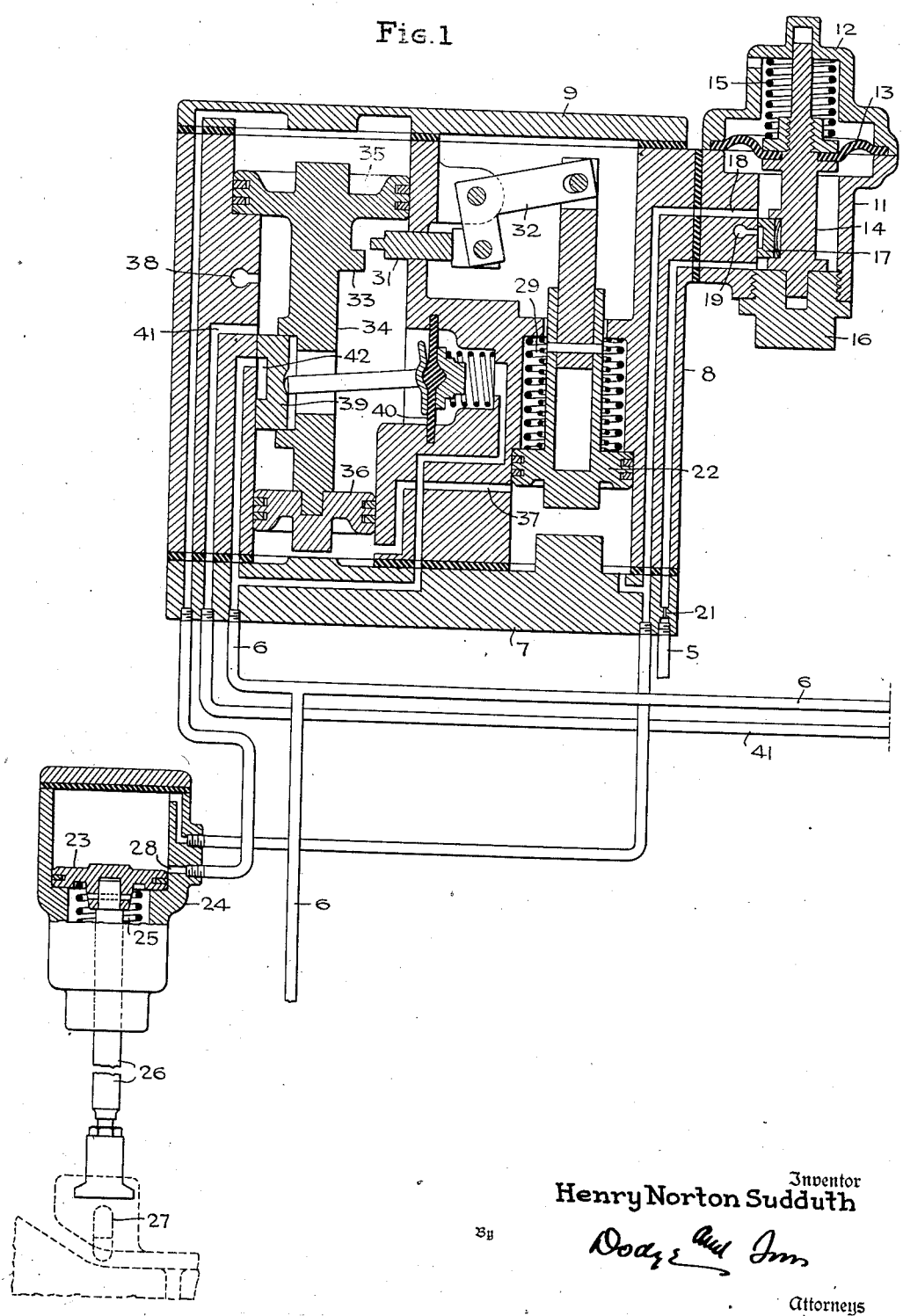

Two typical units, differing slightly in detail will now be described to make clear the principles of the invention. In the accompanying drawings, Figure 1 is a section of the pilot mechanism which senses the condition of load as the brake pipe is charged from a substantially vented condition to a partially charged condition. It is a modified version of the pilot mechanism used in empty and load freight brakes.

Figure 2:
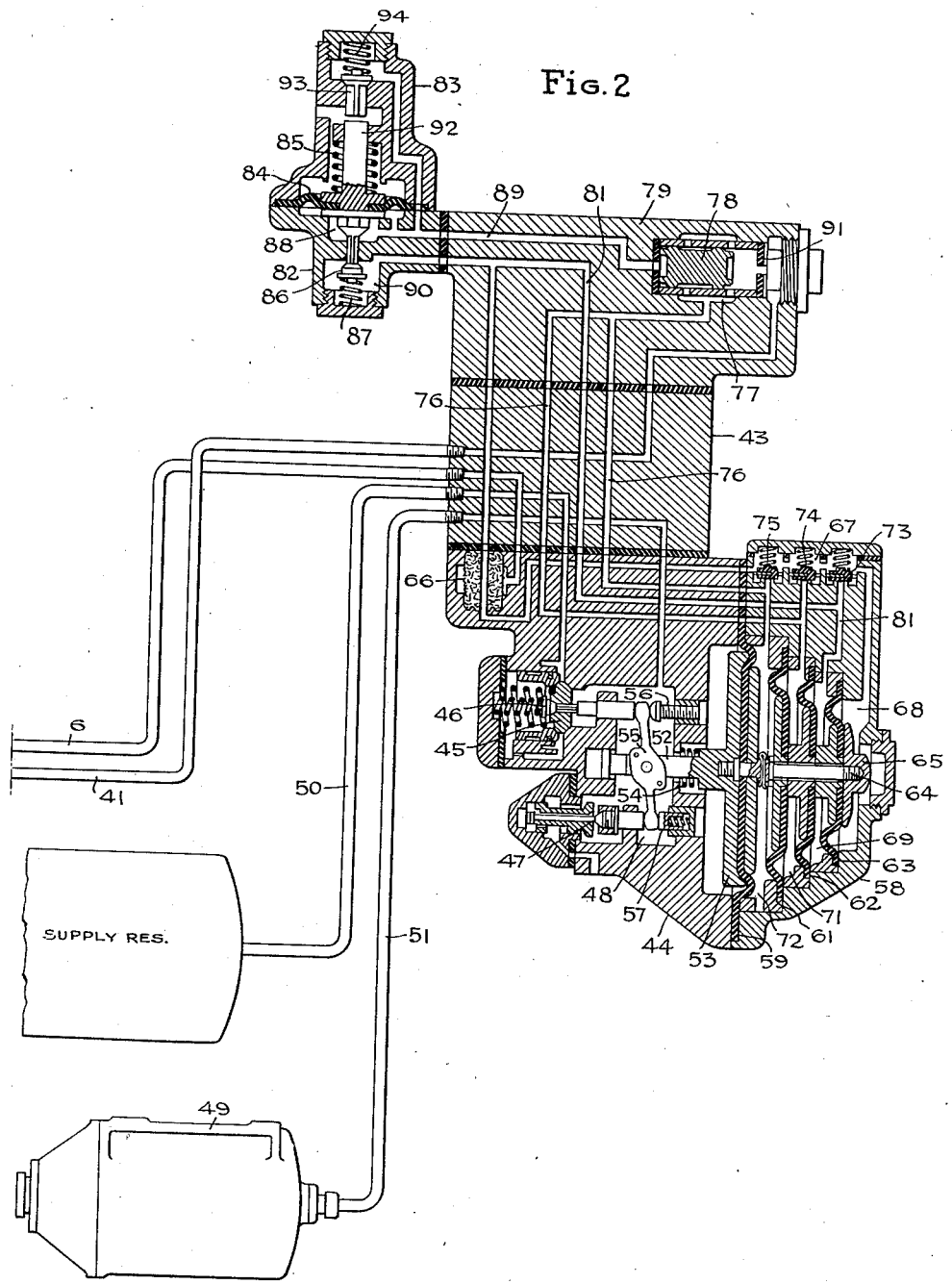

Figure 2 is a section of the relay mechanism, and parts which so associate it with the pilot mechanism of Fig. 1 as to secure a differentiation of braking ratio according to the state of load of the car. The relay can afford four ratios, but only the second (medium-low) and fourth (high) are here used.

Note.—Figs. 1 and 2 assembled in that order from left to right form a diagram for the equipment of one car, or one truck of a long car. The views are diagrammatic to the extent that all the ports are shown on the plane of section so that flows may be readily traced.

Figure 3:
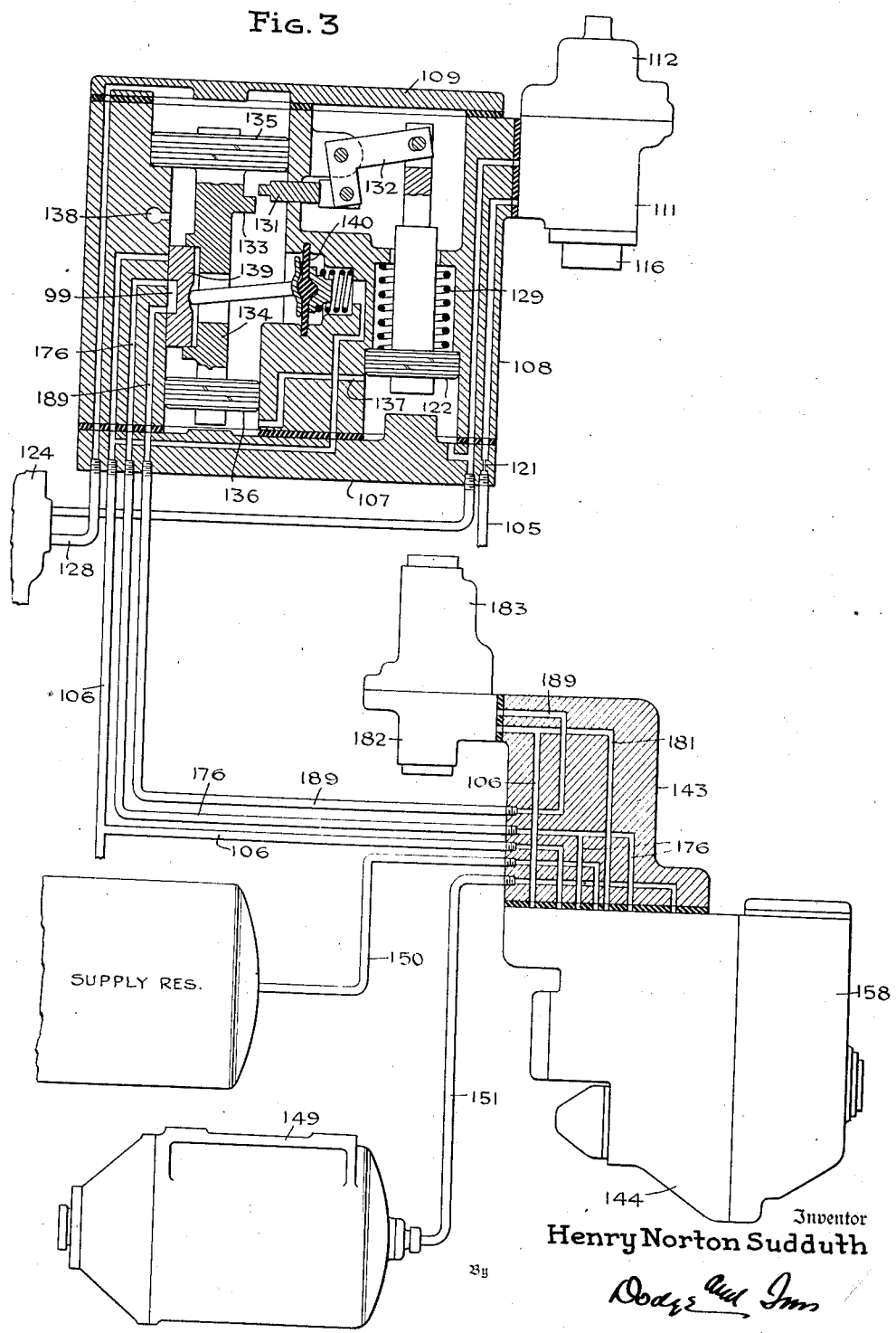

Figure 3 is a view similar to Figs. 1 and 2, showing the omission of the double seated check valve of Fig. 2, and the incorporation of its functions in the pilot valve. An additional pipe connection is required in consequence.

In numbering passages, to simplify tracing connections a single numeral will be used for any continuous unrestricted passage even though part of it comprises a pipe or tube.

A portion of the automatic brake pipe appears at 5.

The car would be equipped with some brake controlling valve device connected with the brake pipe and controlled by pressure therein, and a D-22 control valve will be assumed. The pipe 6 of Figs. 1 and 2 communicates with the "number sixteen" connection of the control valve, but the control valve itself is conventional and hence is not illustrated in the drawings.

The pipes 5 and 6 are each connected with ports in the lower cap 7 of the pilot valve which has a housing 8 and an upper cap 9. Attached to housing 8 is the body 11 of the cut-off valve. A vented cap 12 confines the margin of a diaphragm 13, to the center of which is connected valve stem 14. A biasing spring 15 urges stem 14 downward. The lower end of the stem is guided in closure plug 16.

The cut off valve proper is a slide valve 17 which is shifted by stem 14 and in its lower position exposes the end of passage 18 so that it may charge from the brake pipe. In its upper position valve 17 connects passage 18 with exhaust port 19. Brake pipe 5 is constantly connected through choke 21 with the space within housing 11 below diaphragm 13.

When the brake pipe is vented, as it is on a car when cut out for switching or during loading, valve 17 is in the lower position as shown. When the brake pipe is charged, and after a delay imposed by choke 21 diaphragm 13 shifts valve 17 to its upper position. This occurs when the pressure beneath diaphragm 13 reaches 30 pounds per square inch. Thus in early phases of any charging cycle port 18 which is normally vented, is put under a pressure which rises to 30 pounds per square inch, whereupon the port 18 is again vented.

Port 18 leads to the space below latch piston 22 and to the space above strut piston 23. Strut piston 23 works in cylinder 24 and is normally retracted by spring 25. Cylinder 24 is mounted on a spring-borne part of a truck or of the car, and the stem 26 of piston 23 is arranged to collide with a stop 27 carried by some part which is not spring-borne. Consequently, the distance piston 23 can move downward, will be full stroke if the car is lightly loaded, and less if the truck is heavily loaded. In the first case the piston exposes port 28 and in the second case it does not.

The latch piston 22 is biased downward by a spring or springs 29, and when in its upper position (assumed when port 18 is under pressure), the piston retracts latch pin 31 (shown retracted in Fig. 1). A bell-crank 32 forms the actuating connection between the latch pin and the piston stem. The latch may engage either side of a keeper 33 on the stem 34 which connects two differential pistons, a large piston 35 and a small piston 36.

When latch piston 22 reaches its uppermost position, it exposes port 37 and admits air from port 18 to the space below piston 36. When strut piston 23 exposes port 28, it admits air, also from port 18 to the space above piston 35. The space between pistons 35 and 36 is vented to atmosphere at 38.

Stem 34 shifts valve 39 which in its lower position exposes the end of load passage 41 and thus vents it to atmosphere. In its upper position valve 39 connects load passage 41 with the "number sixteen" passage 6 by way of cavity 42.

Valve 39 is held seated by pressure in passage 6 acting on diaphragm 40 and loading the valve through a strut. Hold-downs of this type are well known in the air brake art.

Thus in the first part of each charging cycle the pressure surge in passage 18, protrudes the strut piston or feeler to sense the state of load, unlatches valve stem 34, causes valve 39 to assume the proper position indicated by the range of motion of the strut piston, latches the valve in the position then assumed, and finally allows strut piston 23 to retreat so that it will not be subject to continual wear while the car is in transit.

All the mechanism so far described comprise a device to put load passage 41 in communicaiton with the brake controlling valve device if the car is loaded, and to interrupt this connection and vent the load passage 41 if the car is light. Other devices capable of performing these functions can be substituted.

Referring now particularly to Figure 2, 43 represents a pipe bracket common in the art and to which all pipe connections are made. The pipe bracket carries the relay valve body 44. Mounted in this body is a main inlet valve 45 in which is mounted the usual inlet pilot valve 46. Both of these valves open outward, i. e., to the left as viewed in Figure 2.

Also mounted in the body 44 is an exhaust valve 47 which opens inward, i. e., to the right in Figure 2. The two inlet valves, and the exhaust valve communicate with a chamber 48 formed within the housing 44 and communicating with the brake cylinder 49 by passage 51 formed partly in the body 44, partly in the pipe bracket 43 and partly by a connecting pipe which extends between the bracket and the brake cylinder.

The inlet valves are supplied with air by the supply reservoir connection 50. This leads from the usual supply reservoir by way of pipe 50 and a continuing passage formed partly in the pipe bracket and partly in the body of the relay valve.

Guided in the body 44 is the usual plunger 52 which carries a diaphragm thrust plate 53 urged to the right by a moderately heavy coil compression spring 54. The plunger 52 carries the usual rocker arm 55 which under release conditions is sustained at one end by the adjustable stop 56 and at the other end by a spring stop 57, whose function is to close the exhaust valve 47 on initial movement of the plunger to the left from the release position shown in Figure 2. The combined admission and exhaust valve mechanism here shown is familiar in the art. When the plunger 52 starts to the left, the first effect is to close the exhaust valve 47, thus terminating exhaust flow from the chamber 48 and connected brake cylinder. Further movement of the plunger opens first the pilot inlet valve 46, and then the main inlet valve 45. Each of these valves is biased in a closing direction by a spring and by supply reservoir air pressure.

Reacting against the diaphragm plate 53 is the diaphragm 59 which is the largest of a stack of four diaphragms 59, 61, 62 and 63. These are graduated in size according to principles well understood in the braking art to give different braking ratios.

The diaphragms are clamped at their margins by means of a series of seat rings and by the relay valve cap 58 which encloses the margins of the diaphragms and the rings. Each of the diaphragms 61, 62 and 63 carries at its center a thrust disk. All these disks are tied together and to the disk 53 by a tie rod 64 and a cap plate 65 which acts as a nut threaded on the righthand end of the tie rod 64.

A branch of the "number sixteen" connection from the brake controlling valve device here designated by the numeral 6 leads through the pipe bracket and through a filter 66 mounted in the body 44 to and through the release check valve chamber 67 to the chamber 68 on the outer or righthand side of diaphragm 63.

There is a second diaphragm chamber 69 between the diaphragm 63 and 62, a third diaphragm chamber 71 between the diaphragm 62 and 61 and a fourth diaphragm chamber 72 between the diaphragm 61 and 59.

From the chambers 69, 71 and 72 three spring loaded check valves 73, 74 and 75 permit releasing flow to the check valve chamber 67 and consequently to the passage 6. These check valves close against flow toward the various chambers except the chamber 68 but permit free releasing flow from these chambers at any time.

This four-diaphragm relay is capable of operating at four different pressure ratios with respect to pressure in the chamber 48 but only two of these ratios are availed of in the arrangement here disclosed, namely, chamber 72, which gives a 1 to 1 ratio as between pressures in chamber 72 and in chamber 48; and chamber 69 which gives a 1 to 0.6 ratio as between pressures in this chamber and the balancing pressure in the chamber 48. To effect this result chambers 71 and 72 are in free communication with each other through the passages 76 so that diaphragm 61 is inert. Similarly, chamber 69 is connected through the passage 81 with the passage 6 which as stated is in free communication with the space 68. This renders the diaphragm 63 inert.

The passages in question are formed as shown, partly in the body 44, partly in the pipe bracket 43 and partly in the housing 79 which is mounted on the pipe bracket 43 and encloses the double throw check valve whose valve element is indicated at 78. The side port of this check valve is indicated at 77.

Mounted on the body 79 is the housing 82 of the inshot valve. The housing 82 has a cap 83, and clamped between the body and cap is the periphery of the valve-actuating diaphragm 84. The diaphragm 84 carries at its center a guided stem 92 and the diaphragm is biased downward by a coil compression spring 85 which surrounds this stem.

In the normal downward position of the diaphragm 84 the lower end of the stem 92 strikes the pilot of the inshot valve 86 and holds this valve open against the stress of its loading spring 87, permitting flow to occur normally from the space 90, which is in communication with passage 6 and port 81, to the passage 89 which leads to the lefthand seat of the double throw check valve 78.

When the diaphragm 84 is forced up against the urge of spring 85 by pressure developed in the passage 89, the effect is first to permit the valve 86 to close, and then if the motion continues, to open an exhaust valve 93 against the urge of its seating spring 94.

Passage 41 leads to the righthand seat 91 of the double throw check valve 78.

Operation of the structure of Figures 1 and 2

*No-load condition.*—Under no load conditions the valve 39 is in the lower position (Figure 1). Passage 41 is vented. When an application is made, pressure is developed in passage 6 and consequently in the chamber 90 beneath the inshot valve which is open. This will develop pressure in the passage 89 until 7 pounds per square inch is developed in that passage at which time diaphragm 84 will overpower spring 85 and permit valve 86 to seat.

Pressure so developed in passage 89 forces the double throw check valve 78 to the right, opening the side port 77 and permitting air to flow from passage 89 through the passage 76 to chambers 62 and 72. Only 7 pounds per square inch will be developed in this way. This pressure effective in the chamber 72 will just overcome the resistance of spring 54 and the friction of the diaphragms. In consequence the relay is conditioned to act immediately upon the development of pressure in the chamber 69. This pressure will develop promptly by flow through passages 6 and 81. Thus the braking action developed in the low ratio setting for no load will not be reduced or delayed by the resistance of spring 54 or by the friction of the diaphragms. Consequently even a rather limited no-load application will start promptly.

*Load condition.*—Under load conditions valve 39 is in its upper position. Air flows from passage 6 through cavity 42, passage 41 and consequently to the righthand seat 91 of the double throw check valve 78. The valve moves to the left and flow continues through the passage 76 to chambers 71 and 72. The pressure is effective in chamber 72 at once to cause the brake application on the 1 to 1 ratio giving the higher braking pressure appropriate to load conditions. If the flow through the inshot valve could occur faster than that outlined, the double throw check valve 78 would shift temporarily to permit it to occur but actually this more rapid action is unlikely. The chambers 68 and 69 are also charged but diaphragms 61, 62 and 63 are inert because under load conditions they are all subject to equal pressures on their opposite sides.

Modification illustrated in Figure 3

In the structure shown in Figure 3 the pilot valve mechanism is essentially the same as that shown in Figure 1. Hence the parts numbered 105 to 140 inclusive correspond to parts numbered 5 to 40 in Figure 1. All the parts within the relay body 144 and cap 158 in Figure 3, are identical with the parts numbered 44 to 75 in Figure 2. The inshot valve housing 182 and cap 183 enclose components identical with those shown in Figure 2 as enclosed in housing 82 and cap 83. In short the differences reside in the form of valve 139, the porting of the seat for this valve, and the porting of the pipe bracket 143.

The valve 139 controls three ports. One of these communicates with passage 106 which is the "number sixteen" passage from the control valve. Another is the end of passage 189, which corresponds to the passage 89 of Figure 2. This is the port to which the inshot valve supplies pressure up to a definite value, here assumed to be 7 pounds per square inch. The third controlled port is the end of passage 176. As shown in Figure 2 the passages 76 (which correspond to passage 176) communicate with the diaphragm chamber spaces 71 and 72. The passage 176 has a similar communication in Figure 3.

In the no load position shown in Figure 3 the cavity 99 in the slide valve 139 connects passages 176 and 189. This causes the inshot valve to develop 7 pounds pressure against the right side of the large diaphragm in the relay. In the load or upper position of the valve 139 passage 189 is blanked, and the "number sixteen" connection 106 is in direct communication through cavity 99 with the passage 176 which leads to the 1 to 1 ratio chamber at the right of the large diaphragm. The operative characteristics are exactly the same as those in the structure shown in Figures 1 and 2.

Figure 3 omits the double-throw check valve 78, but requires three pipe connections between the pilot valve mechanism and the relay instead of two. The ultimate functions are the same.

What is claimed is:

1. Braking ratio controlling means for interposition between a brake controlling valve device and a brake cylinder controlled thereby, comprising in combination a self-lapping relay having two motor abutments; connections for subjecting both said abutments to a control pressure developed by the brake controlling valve device; a normally open inshot valve adapted to close in response to a moderate pressure developed on its discharge side; and load responsive means effective under no-load conditions to interpose said inshot valve in the connection to one of said abutments.

2. A light and load mechanism for interposition between a brake controlling valve device and brake cylinder means controlled thereby, comprising in combination a self-lapping relay having two motor abutments of unequal areas; connections for subjecting both said abutments to a control pressure developed by the brake controlling valve device; a normally open inshot valve adapted to close when a moderate pressure is developed on its discharge side; and load responsive means effective under no load conditions to interpose said inshot valve in the connection to the larger abutment whereby the brake applying effect of the larger abutment is substantially suppressed.

3. A light and load mechanism for interposition between a brake controlling valve device and brake cylinder means controlled thereby, comprising in combination a self-lapping relay having two motor abutments of unequal areas; connections for subjecting both said abutments to a control pressure developed by the brake controlling valve device; a normally open inshot valve adapted to close when a moderate pressure is developed on its discharge side; and load responsive means effective under no load conditions to interpose said inshot valve in the connection to the larger abutment, the inshot valve being adapted to limit the pressure developed on the larger abutment to an amount approximately sufficient to overcome the initial resistance to motion of the relay.

4. A light and load mechanism for interposition between a brake controlling valve device and brake cylinder means controlled thereby, comprising in combination a self-lapping relay of the plural ratio type; ratio selecting means responsive to vehicle load; and an inshot valve controlled by said ratio selecting means and serving to ensure a high ratio start of all relay brake-applying functions up to a pressure sufficient to overcome initial resistance to application and a lower ratio thereafter.

5. The combination of a brake cylinder; means for supplying air under pressure; a relay responsive to a controlling pressure and operable to supply air from said supply means to the brake cylinder at either of two ratios of controlling pressure to brake cylinder pressure; ratio selecting means arranged to respond to the load upon the braked vehicle; and inshot valve means rendered effective by said ratio selecting means to accelerate initial response to the relay when the lower of said ratios is effective.

6. The combination of a brake cylinder; means for supplying air under controlled pressure; a relay having at least two actuating motor abutments of unequal area and graduating inlet and exhaust valve means operable thereby to control admission of air from said supply means to the brake cylinder and exhaust from the brake cylinder; means responsive to load on the vehicle to cause said controlled pressure to effect graduated action of said valves through one or another of said abutments whereby braking pressures are coordinated with load; and an inshot valve rendered effective by said load responsive means to develop a limited pressure rapidly against the large abutment when the load responsive device causes said graduation to be effected through the smaller abutment.

HENRY NORTON SUDDUTH.